(12) United States Patent
Sellers, Jr. et al.

(10) Patent No.: US 9,540,900 B2
(45) Date of Patent: Jan. 10, 2017

(54) MULTI-LAYERED TEMPERATURE RESPONSIVE PRESSURE ISOLATION DEVICE

(71) Applicant: HALLIBURTON ENERGY SERVICES, INC., Houston, TX (US)

(72) Inventors: David Ray Sellers, Jr., Pearland, TX (US); Jeremy Buc Slay, Fort Worth, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/008,266

(22) PCT Filed: Oct. 20, 2012

(86) PCT No.: PCT/US2012/061230
§ 371 (c)(1),
(2) Date: Sep. 27, 2013

(87) PCT Pub. No.: WO2014/062200
PCT Pub. Date: Apr. 24, 2014

(65) Prior Publication Data
US 2015/0218903 A1 Aug. 6, 2015

(51) Int. Cl.
*E21B 33/12* (2006.01)
*F16J 15/16* (2006.01)
(Continued)

(52) U.S. Cl.
CPC ......... *E21B 33/1208* (2013.01); *E21B 33/128* (2013.01); *E21B 33/1212* (2013.01);
(Continued)

(58) Field of Classification Search
CPC .............. E21B 33/1212; E21B 33/1277; E21B 33/128; E21B 33/1208; E21B 36/00; E21B 33/127; E21B 33/1285; E21B 33/1291; F16J 15/164; F16J 15/028; F16J 15/26; F16J 55/132
See application file for complete search history.

(56) References Cited

U.S. PATENT DOCUMENTS 4,424,865 A   1/1984   Payton, Jr.
4,515,213 A   5/1985   Rogen et al.
(Continued)

FOREIGN PATENT DOCUMENTS

EP   1660795 A1   5/2006

OTHER PUBLICATIONS

International Search Report dated Apr. 29, 2013 for Application No. PCT/US2012/061230.
(Continued)

*Primary Examiner* — Yong-Suk (Philip) Ro
(74) *Attorney, Agent, or Firm* — Haynes and Boone LLP (57) ABSTRACT

A sealing element comprises two distinct materials of different melting points. An outer shell material has a higher melting point than an inner core material. The core material can be a relatively low melting point metal, plastic or polymer. The seal is positioned in the wellbore and, in response to heating to a selected temperature, such as a bottom hole static temperature, the core material melts or softens. Upon melting or softening of the inner material, the outer shell's elastic modulus decreases, allowing longitudinal compression and radial expansion of the sealing element. The inner material can also thermally expand and thereby assist or cause radial expansion of the outer shell. The sealing element can provide a metal-to-metal seal with a casing or tubing. The cross-sectional shape of the outer shell can take various shapes to promote controlled compression, expansion and sealing.

20 Claims, 6 Drawing Sheets

(51) Int. Cl.
  *F16J 15/26* (2006.01)
  *E21B 33/128* (2006.01)
  *E21B 33/129* (2006.01)
  *F16J 15/02* (2006.01)
  *F16L 55/132* (2006.01)

(52) U.S. Cl.
  CPC ...... *E21B 33/1285* (2013.01); *E21B 33/1291* (2013.01); *F16J 15/028* (2013.01); *F16J 15/164* (2013.01); *F16J 15/26* (2013.01); *F16L 55/132* (2013.01)

(56) References Cited

U.S. PATENT DOCUMENTS

| | | | |
|---|---|---|---|
| 4,862,967 A * | 9/1989 | Harris | E21B 33/1208 |
| | | | 166/179 |
| 5,165,703 A | 11/1992 | Morvant | |
| 5,195,583 A * | 3/1993 | Toon | E21B 33/1243 |
| | | | 166/179 |
| 5,775,429 A | 7/1998 | Arizmendi et al. | |
| 6,446,717 B1 * | 9/2002 | White | E21B 33/1212 |
| | | | 166/187 |
| 7,304,098 B2 | 12/2007 | Li et al. | |
| 7,455,104 B2 | 11/2008 | Duhon et al. | |
| 7,673,692 B2 | 3/2010 | Kunz | |
| 7,703,539 B2 | 4/2010 | Levy | |
| 7,735,567 B2 * | 6/2010 | O'Mally | E21B 33/1208 |
| | | | 166/179 |
| 7,743,825 B2 | 6/2010 | O'Malley et al. | |
| 7,748,468 B2 | 7/2010 | Casciaro | |
| 7,828,068 B2 | 11/2010 | Gano et al. | |
| 7,832,490 B2 | 11/2010 | Willauer | |
| 7,841,417 B2 | 11/2010 | Allison et al. | |
| 8,051,913 B2 | 11/2011 | Huang et al. | |
| 8,499,843 B2 * | 8/2013 | Patel | E21B 33/1208 |
| | | | 166/387 |
| 2002/0166672 A1 | 11/2002 | White et al. | |
| 2006/0048936 A1 | 3/2006 | Fripp et al. | |
| 2006/0186602 A1 | 8/2006 | Martin et al. | |
| 2008/0264647 A1 | 10/2008 | Li | |
| 2009/0071641 A1 | 3/2009 | Gaudette et al. | |
| 2010/0078173 A1 | 4/2010 | Buytaert et al. | |
| 2011/0030954 A1 | 2/2011 | Allison et al. | |
| 2011/0132611 A1 | 6/2011 | Rytlewski et al. | |
| 2011/0174506 A1 | 7/2011 | Duong | |

OTHER PUBLICATIONS

Written Opinion dated Apr. 29, 2013 for Application No. PCT/US2012/061230.

* cited by examiner

MULTI-LAYERED TEMPERATURE RESPONSIVE PRESSURE ISOLATION DEVICE

CROSS REFERENCE TO RELATED APPLICATIONS

None.

BACKGROUND

Technical Field

This application relates to expandable sealing elements, such as packing elements, for use in operations in wellbores. More particularly, the application relates to a metal-to-metal sealing device and methods of use.

Background Art

Tools containing an expandable sealing element may be used to perform various operations or tasks in a wellbore. The expandable sealing element may be used to provide an annular pressure seal, a plug, a packer, a patch, on expandable tubing, as an anchor, tubing hanger, etc. For example, a packer tool is commonly used during wellbore operations to seal against pressure or isolate fluid. A packer tool is an expandable plug used to seal off an annular area around a tubing or casing section when cementing, acidizing, isolating, producing, etc., a formation zone. The packer tool is run into the wellbore, typically on a work string or production tubing. Sealing elements are expanded radially, and typically compressed axially, and seal the packer tool against the wellbore, cased or uncased. A packer tool typically consists of a sealing element or elements which are actuated by a setting assembly, one or more holding assemblies such as slips, and at least one interior passage for fluid flow.

Elastomeric materials are frequently used for packing and other sealing elements because of their resiliency. Elastomeric elements may be insufficient under certain conditions, such as high temperature, high pressure, and chemically hostile environments. A metal-to-metal contact between, for example, a sealing element and a casing is less prone to extrusion under such circumstances. However, typical manufacturing tolerances of the casing, deformation during transport and installation, etc., often lead to ovality, upsets, and other non-conformities, which tend to reduce the sealing capabilities of the metal-to-metal contact. Leakage, extrusion and other problems can result. Further, even if an initial seal occurs, the seal may leak under changing conditions of temperature and/or pressure.

Prior efforts, such as shown in U.S. Pat. No. 2,519,116, incorporated herein by reference for all purposes, to effect metal to metal contact have employed detonating explosive charges disposed on a rod within a packer cavity to expand an outer ductile metal wall of the packer. The expanded metal wall engages the casing and forms a metal to metal contact. Further, U.S. Pat. No. 2,306,160, also incorporated herein by reference for all purposes, teaches a fluid injected into a cavity to inflate the cavity and effect a seal. The reference discloses that suitable liquid materials injected into the cavity are liquids which harden after expansion. More recent efforts include U.S. Pat. No. 6,446,717, to White et al., which discloses a sealing assembly with a deformable portion and a core, at least partially disposed within the deformable portion, that can be radially expanded to engage an adjacent surface and effect a seal. In one embodiment, the core encases a compressible fluid and the deformable portion comprises a deformable metal. The core can retain an amount of stored energy and adjust to changing conditions that otherwise might affect seal integrity. U.S. Pat. No. 7,445,104, to Duhon, discloses an apparatus for use in a wellbore, comprising an element formed of a superplastic material to perform a predetermined downhole task. The apparatus can comprise a flowable element and a deformable element adapted to be expanded by flowing the flowable element. Installation methods can include running a tubular structure into a wellbore and activating a heating element to heat at least a portion of the tubular structure to enable the tubular structure to exhibit a highly deformable characteristic while maintaining structural integrity. The White and Duhon references are hereby incorporated herein in their entirety for all purposes.

Therefore, a need exists for a metal-to-metal sealing assembly with increased sealing capabilities and sufficient resiliency, particularly under adverse conditions in an oil field well. Further, a need exists for such a sealing assembly which is retrievable.

SUMMARY

A sealing element comprises two distinct materials of different melting points. An outer shell material has a higher melting point than an inner core material. The core material can be a relatively low melting point metal, plastic or polymer. The seal is positioned in the wellbore and, in response to heating to a selected temperature, such as a bottom hole static temperature, the core material melts or softens. Upon melting or softening of the inner material, the outer shell's elastic modulus decreases, allowing longitudinal compression and radial expansion of the sealing element. The inner material can also thermally expand and thereby assist or cause radial expansion of the outer shell. The sealing element can provide a metal-to-metal seal with a casing or tubing. The cross-sectional shape of the outer shell can take various shapes to promote controlled compression, expansion and sealing. The sealing element can be unsettable or retrievable.

BRIEF DESCRIPTION OF THE DRAWINGS

The drawing is incorporated into and forms a part of the specification to illustrate at least one embodiment and example of the present invention. Together with the written description, the drawing serves to explain the principles of the invention. The drawing is only for the purpose of illustrating at least one preferred example of at least one embodiment of the invention and is not to be construed as limiting the invention to only the illustrated and described example or examples. The various advantages and features of the various embodiments of the present invention will be apparent from a consideration of the drawing in which.

DETAILED DESCRIPTION

The present invention provides a sealing assembly using deformable materials, such as deformable metal, with a core disposed within the sealing assembly. The sealing element can be used, for example, on a packer tool downhole in a well, although it is understood that the invention can be used in other applications and is not limited to the exemplary embodiments shown and described. The sealing element can be used to provide a metal-to-metal seal between metallic objects disposed in a wellbore and exposed to relatively high temperatures.

Figure 1:
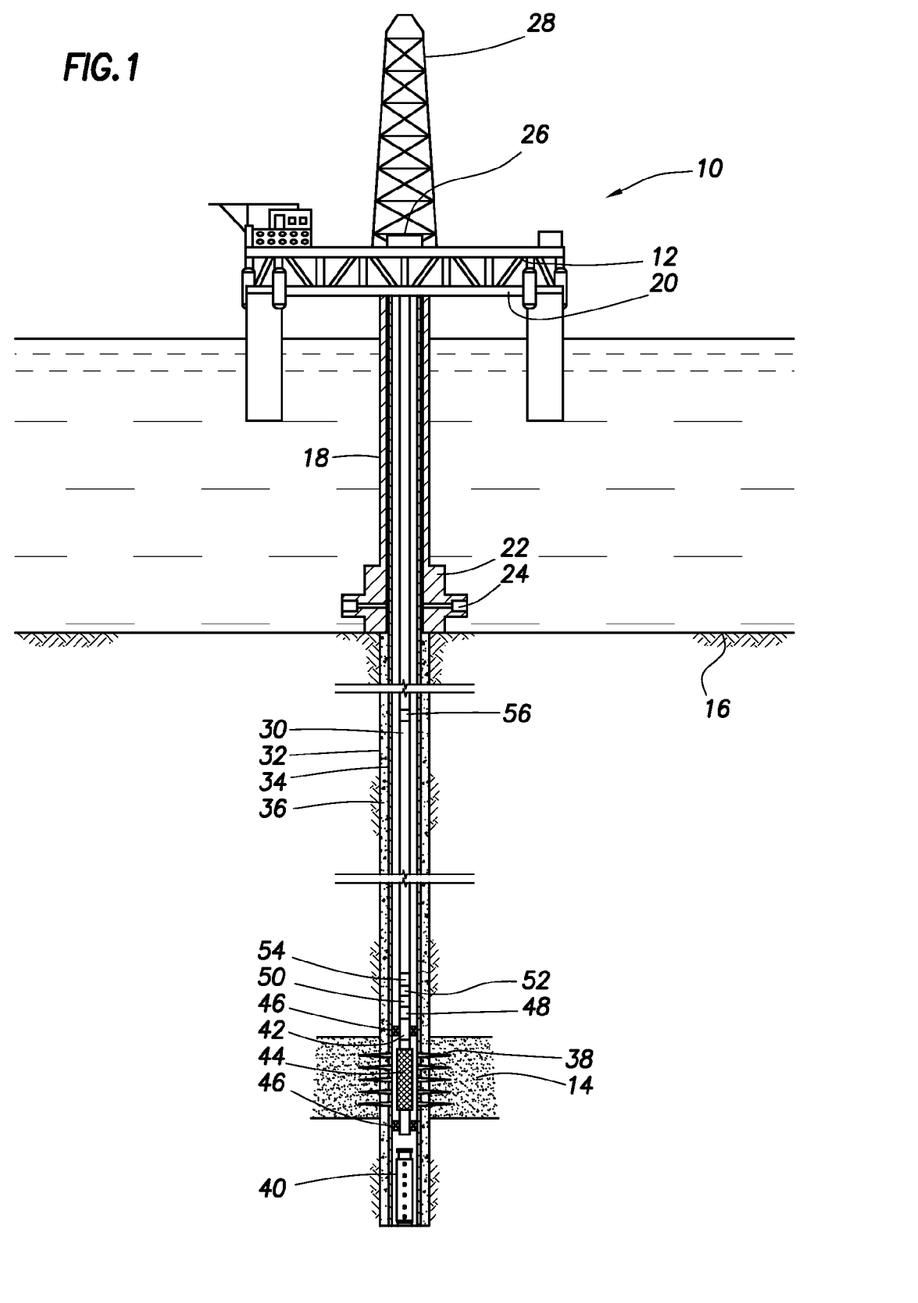
FIG. 1 is a schematic view of a typical downhole well having at least one sealing element according to an aspect of the invention.

Referring initially to FIG. 1, an offshore oil and gas platform performing completion operations is schematically illustrated and generally designated 10. A semi-submersible platform 12 is centered over a submerged hydrocarbon-bearing formation 14 located below sea floor 16. A subsea conduit 18 extends from deck 20 of platform 12 to wellhead installation 22 including blowout preventers 24. Platform 12 has a hoisting apparatus 26 and a derrick 28 for raising and lowering pipe strings such as completion string 30. A wellbore 32 extends through the various earth strata including formation 14. A casing 34 is cemented within wellbore 32 by cement 36. Casing 34 has been perforated at formation 14 to create perforations 38 using perforating guns 40 which have been released into the rat hole of wellbore 32. Thereafter, completion string 30 has been lowered to locate a sand control screen assembly 44 proximate to formation 14 such that a pair of sealing assemblies 46 having one or more sealing elements can isolate production from formation 14. Uphole of sand control screen assembly 44 is a cross-over 42 that allows for a treatment operation within the production interval at formation 14 such as a gravel pack, fracture stimulation, frac pack or the like. Uphole of cross-over 42 is a fluid loss control valve 48 that prevents the loss of fluid from within completion string 30 to formation 14 during completion operations to other formations (not pictured) uphole of formation 14.

Also depicted within completion string 30 is a tubing test valve 50 that allows for the periodic pressure testing of completion string 30 during installation thereof. Completion string 30 also includes a plurality of landing nipples, such as landing nipple 52, which is used to receive, for example, wireline set tools such as permanent and temporary bridge plugs as well as other types of flow control devices. A sliding side door valve 54 is also depicted within completion string 30. Sliding side door valve 54 may be used to selectively permit and prevent fluid communication between the interior of completion string 30 and the wellbore annulus. Completion string 30 includes one or more subsurface safety valves, such as safety valve 56, that prevent out of control well conditions from traveling to the surface.

Although the discussion herein is primarily directed at use of the sealing element on a packer tool, it is understood that the sealing element can be used in any conventional tool or device which requires a sealing element.

Figure 2:
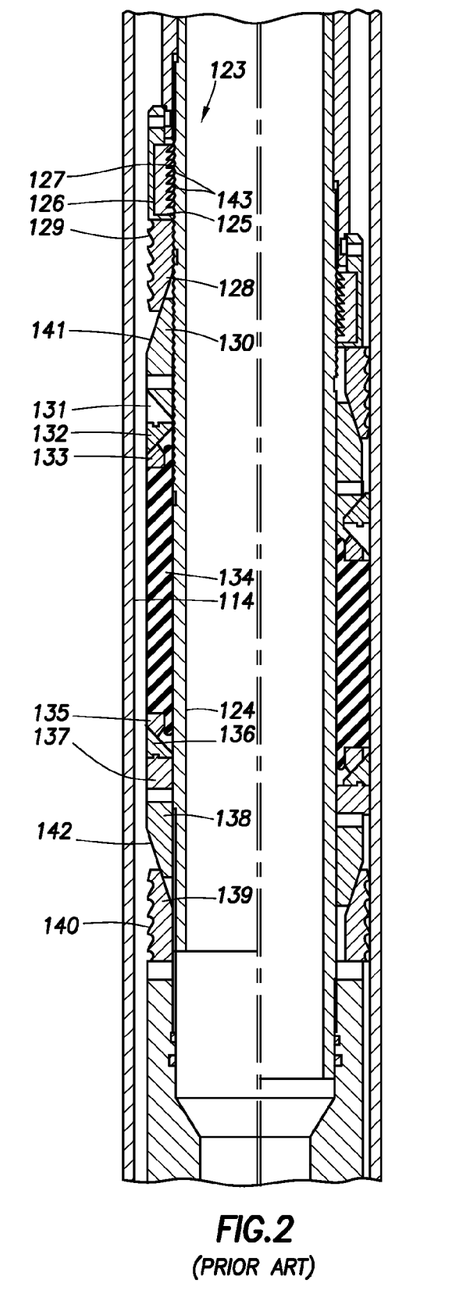
FIG. 2 is a schematic cross-sectional view of a prior art packer tool on which an embodiment of the sealing assembly can be employed in accordance with an aspect of the invention.

FIG. 2 is a schematic cross-sectional view of a commercially available prior art permanent packer tool 123. The packer tool is shown in a run-in position on the left side of the schematic view and in a set position on the right side of the view. The packer tool 123 includes a packer body or mandrel 124 having ratchet teeth 125 defined thereon. A lock ring housing 126 is disposed in an upper portion of the packer tool 123. A lock ring 143 is disposed between the lock ring housing 126 and the mandrel ratchet teeth 125. The lock ring 143 includes mating ratchet teeth 127 adjacent the teeth on the mandrel ratchet 125. At least one upper slip 128 and typically a plurality of slips are disposed below the lock ring housing 126 and include a serrated outer surface where the serrations are typically referred to as wickers 129 or teeth. The upper slip 128 is disposed about the circumference of the packer tool 123 and are used to hold the tool in position when the wickers 129 grip the casing 114. An upper cone 130 is disposed below the upper slip 128. The upper cone 130 includes a tapered surface 141 that mates with a corresponding tapered surface on the upper slip 128. The upper cone 130 is used to displace the upper slip 128 radially outward as an axial force is applied to the slip 128 in a direction toward the upper cone. A pair of backup rings 131, 132 is disposed below the upper cone 130 and includes tapered surfaces that allow the backup rings to be displaced toward the casing 114 during "setting" of the packer into a sealing position. A seal ring 133 is disposed below the backup ring 132. A deformable packing or sealing element 134 is disposed below the seal ring 133. In this prior art embodiments, the sealing element is typically an elastomeric material that can be axially compressed and radially expanded toward the casing 114 to effect an annular seal. A corresponding arrangement of elements is disposed below the packing element 134 as is disposed above the sealing element. The arrangement of members below the sealing element includes a seal ring 135, a pair of backup rings 136, 137, a lower cone 138 having a tapered surface 142, and a lower slip 139 having wickers 140.

To set the packer tool 123, mechanical or hydraulic methods can be used and are well known in the art. Regardless of the method used to set the packer tool, generally the objective is to lower the packer tool attached to a tubing string or other conveyance to a setting depth and axially compress the assembly of external components relative to the mandrel. The axial compression causes at least a portion of the external components, such as the slips 128, 139 and the sealing element 134, to expand radially outward into engagement with the casing 114. The lock ring housing 126 and the lock ring 143 are forced along the mandrel ratchet 125 as the slips and the sealing element are radially expanded. When the desired amount of longitudinal compression is reached, the teeth on the mandrel ratchet 125, in cooperation with the corresponding ratchet teeth 127 on the lock ring 143, maintain the lock ring and the lock ring housing 126 in the set position. The wickers 129, 140 of the slips 128, 139 bite into the casing surface to hold the packer tool 123 in position.

The permanent packer tool is described for discussion purposes only. Many other types of packer tools are commercially available, and may become available, having different configurations, such as service packers, production packers, single or tandem packers, tension set packers, hydraulic set packers, tubing set packers, wireline set packers, single or double bore packers, inflatable packers, permanent and retrievable packers, disappearing or drillable packers, etc. The invention described herein can be used in conjunction with various packer types, as will be recognized by those of skill in the art. For disclosure regarding retrievable packers, see, for example, U.S. Pat. No. 6,691,788 to Dearing, U.S. Pat. No. 5,720,343 to Kilgore, U.S. Pat. No. 5,333,685 to Gilbert, U.S. Pat. No. 5,433,269 to Hendrickson, and U.S. Pat. No. 6,378,606 to Swor, all of which are incorporated herein by reference in their entirety for all purposes.

Elastomeric materials are frequently used for the sealing element or elements because of the resiliency of the elastomeric materials. However, under certain adverse conditions, elastomeric elements may be insufficient for the duty. Adverse conditions such as high temperatures, high pressures, and chemically hostile environments are common in downhole oil field wells that produce hydrocarbons. For example, high temperatures and pressures can cause extrusion of elastomeric elements and resulting leakage past the sealing element after installation. Another problem associated with elastomeric elements is dislocation of the elements during run-in, called "swab-off," where a pressure differential between two surfaces of the elastomeric element, such as the inner and outer surfaces, deform the element and cause the element to become dislodged.

Providing a ductile metal as the sealing element has been suggested as a solution to the problem of failure of elastomeric elements. Thus, a metal-to-metal sealing contact is made between, for example, the packing element and the casing that is less prone to extrusion. However, casing irregularities, such as ovality, etc., typically reduce the sealing capabilities of the metal-to-metal contact and leakage can result. Further, even if an initial seal occurs, the seal may leak under changing conditions of temperature or pressure because the metal sealing element is not sufficiently resilient.

Typical environments and situations for use of the invention are wellbores having high static temperatures, such as 400 degrees Fahrenheit or higher, and/or for sealing against differential high pressures, such as 10 kpsi and higher.

Figure 3:
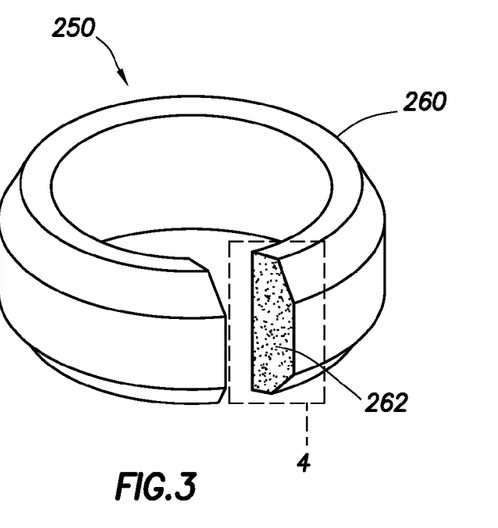
FIG. 3 shows an annular sealing element, in partial cross-section, in accordance with an embodiment of the invention.
Figure 4:
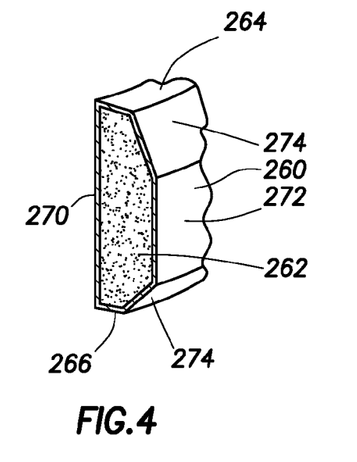
FIG. 4 shows a detail view in cross-section of the annular sealing element of FIG. 3.

FIG. 3 is a partial isometric view showing a cross-sectional view of an embodiment of a sealing element according to an aspect of the invention. FIG. 4 is a detail cross-sectional view of the exemplary sealing element of FIG. 3. An exemplary sealing element 250 can be incorporated into a packer or other sealing tool. The sealing element is made up of two primary parts, an outer, deformable shell 260 made of relatively temperature stable materials and an encased, core 262 made of materials having a relatively low melting point.

The outer shell 260 is dimensioned to expand radially toward a casing or other adjacent structure upon axial compression of the core 262. The shell 260 engages and seals against the casing or adjacent structure after setting or actuation. The shell 260 is preferably made of a high yield strength, temperature-stable metal, such as aluminum, spring steel and the like. In accordance with one embodiment, the shell of high yield strength and temperature stable metal is filled with a core material of relatively low melting point, or glass transition temperature. Upon melting or softening of the core material, the elastic modulus of the sealing element is reduced enough to allow mechanical compression of the shell and core.

The shell can take various shapes and have various features to provide for controlled axial compression, radial expansion, shape in the set position, ease of retrievability, cooperation with other tool elements, and to provide desired characteristics, such as seal element elasticity, yield strength, etc., and to assist or cause actuation upon on-set of pre-selected conditions. For example, the shell 260 seen in FIG. 3 has upper and lower faces 264 and 266, an inner cylindrical face 270, an exterior cylindrical face 272, and one or more angled faces 274. The angled faces can be designed to direct radial expansion. The upper and lower faces 264 and 266 are designed to abut support or actuating surfaces of adjacent tool elements, such as support rings or wedges of a packer tool. The inner cylindrical face is designed to abut the exterior surface of an adjacent mandrel or tubular. Similarly, the exterior cylindrical face 272 is designed to, when in the set position, contact and seal against the casing or other surface. The outer shell creates a metal-to-metal seal with the casing. FIG. 4 provides a detail view of these elements.

Figure 5:
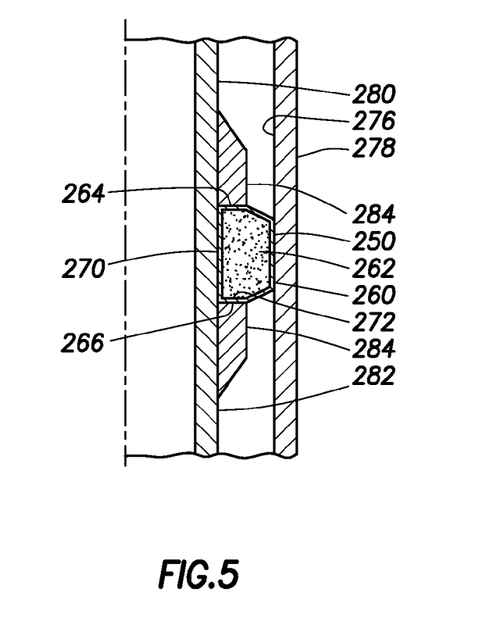
FIG. 5 is a cross-sectional detail view of the sealing element of FIGS. 3-4 in a radially expanded or set position.

FIG. 5 is a cross-sectional detail view of the sealing element of FIGS. 3-4 in a radially expanded or "set" position. The core is heated, for example to wellbore static temperature, and softens or melts, thereby lowering the elasticity of the sealing element. The shell is axially compressed and radially expanded as shown. The exterior face 272 is now in sealing contact with the inner surface 276 of the casing 278. The inner cylindrical surface 270 is in sealing contact with, in this example, the exterior surface 280 of a tool mandrel 282 on which the sealing element is mounted. The upper and lower faces 264 and 266 have been acted upon by packer setting elements 284, in this case wedges which have been moved relatively closer together axially during setting. The remaining tool parts are not shown. The Figure is conceptual and informs the practitioner regarding use of the sealing element between any two spaced-apart surfaces.

In other embodiments, the deformable shell can be disposed radially inward of a tool tubular and effect a radially inwardly directed seal. The sealing element of the invention, as has been discussed, can be used in various packer, sealing and other downhole tools, especially where a metal-to-metal seal is preferred. By using components that activate and retain long term integrity at high temperatures, the element may be used at higher temperatures and for longer periods of time than current sealing elements. The element can also be used on a bridge plug, expandable tool, and other types of tools beyond traditional packers. Such a seal is able to withstand higher temperatures than current elastomer-based elements.

In a preferred embodiment, the shell retains its elasticity so that the tool can be retrieved later. For example, in FIG. 5, the setting elements 284 can be mechanically moved apart axially, allowing the elastic shell to at least partially expand axially and contract radially to an unset or retrievable position. Alternately, the shell can be acted upon by a stored energy device positioned interior to the shell to cause movement to a retrievable position. Expansion of the inner core material can also be used to cause or assist setting. Further, where the elasticity of the shell is compromised or the shell is plastically deformable, un-setting features can be used to cause elongation for retrieval. For example, tabs or other elements can be positioned at the upper and lower faces of the shell. Practitioners will recognize other mechanisms for decompressing the sealing element to a retrievable or unset position.

In other embodiments, the shell is coated or covered with one or more materials to provide better sealing. For example, the metal shell can be coated or covered on one or more faces with a rubber, plastic or other material to improve sealing.

The core 262 is made of selected material or materials, which can be a compound, mixture, or other combination of materials. Exemplary core materials include low melting point steel, corrosion-resistant alloy (CRA), titanium and nickel alloys, tin, lead, other metal alloys, wood's metal, model metal, solder, pewter, plastics, etc. Another possible candidate for the core is a polymer having a high temperature stability. For example, where additional or more gradual expansion of the sealing element is desired after positioning, then a polymer with a high coefficient of expansion at the target temperature range could be used.

The core 262 contains a relatively lower melting point metal or polymer in a preferred embodiment, wherein the core is designed to melt or soften at operating temperatures in the wellbore. The core preferably melts or softens to allow radial expansion and axial compression of the sealing element. In one embodiment, the sealing element is lowered into position and heated, by environmental temperature and pressure, to at or above a preselected temperature. Once the core has softened or melted, the tool is set in the usual fashion. In an alternative embodiment, the softening and subsequent ease of deformation of the core and sealing element triggers radial expansion. For example, softening of the core can reduce sealing element strength such that a pre-loaded axial compression force, such as by biasing springs, compressed gas compartments, etc., acts to deform the now-soft sealing element. The pre-loaded compressive force is too low to prematurely set the sealing element, but as the core softens and the sealing element loses axial strength, the pre-load sets the element. Further, the core material is preferably selected of a material which undergoes thermal expansion or changes phases (i.e., from solid to liquid) at preselected temperatures. The thermal expansion and possible phase change of the core component also provides volumetric expansion of the element and aids in creating a long term metal-on-metal seal.

Due to the fact that metals will have a lower compressibility than the typical elastomer, the sealing element can be designed to have an atypical shape in order to compress properly. FIGS. 6-9 are cross-sectional detail views of alternative embodiments of the sealing element according to aspects of the invention, seen in compressed and uncompressed positions.

Figure 6A:
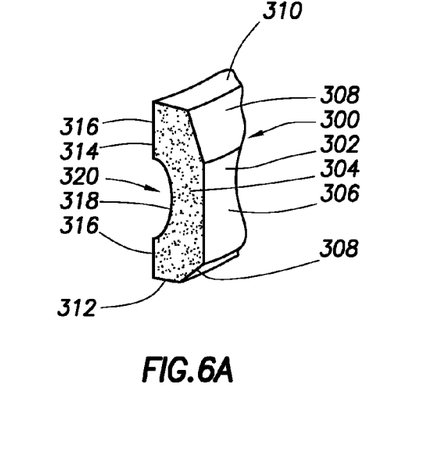
FIGS. 6A-B are cross-sectional detail views of an alternative embodiment of the sealing element according to aspects of the invention, in compressed and uncompressed positions.
Figure 6B:
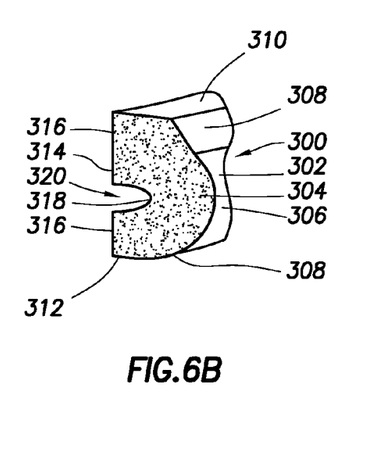

FIG. 6A shows an uncompressed sealing element 300 having a shell 302 and a core 304. FIG. 6B shows the sealing element of FIG. 6A in a compressed position. The shell has a cylindrical exterior face 306, relatively flat angled faces 308, and relatively flat and radially extending upper and lower surfaces 310 and 312. The interior surface 314 has one or more relatively cylindrical faces 316 for sealing against a mandrel or the like. The interior surface further defines one or more curved surfaces 318, concave with respect to the mandrel and defining an open annular space 320 between the sealing element and the mandrel.

Figure 7A:
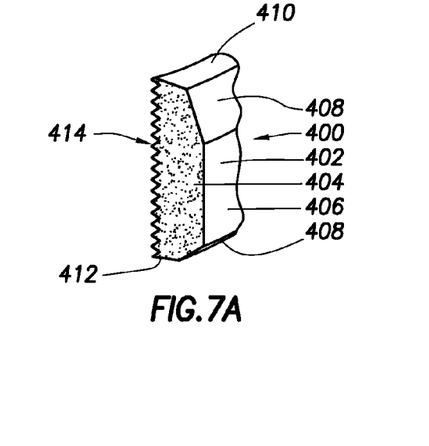
FIGS. 7A-B are cross-sectional detail views of an alternative embodiment of the sealing element according to aspects of the invention, in compressed and uncompressed positions.
Figure 7B:
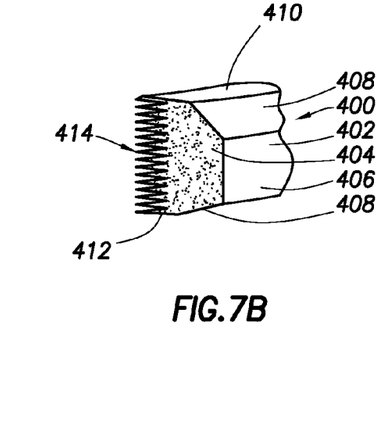

FIG. 7A shows an uncompressed sealing element 400 having a shell 402 and a core 404. FIG. 7B shows the sealing element of FIG. 7A in a compressed position. The shell has a cylindrical exterior face 406, relatively flat angled faces 408, and relatively flat and radially extending upper and lower surfaces 410 and 412. The interior surface 414 is corrugated, defining alternating furrows and ridges. The corrugated surface collapses in a controlled fashion to the shape seen in FIG. 7B. The corrugations can also be designed to provide preferred strength characteristics of the shell and element.

Figures 8A, 9A:
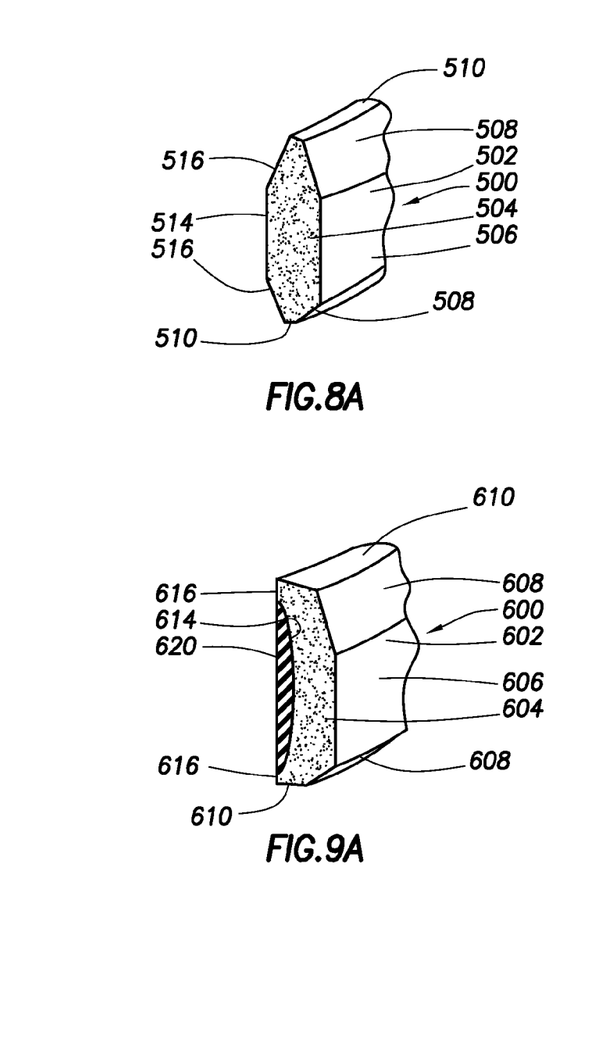
FIGS. 8A-B are cross-sectional detail views of an alternative embodiment of the sealing element according to aspects of the invention, in compressed and uncompressed positions.
FIGS. 9A-B are cross-sectional detail views of an alternative embodiment of the sealing element according to aspects of the invention, in compressed and uncompressed positions.
Figure 8B:
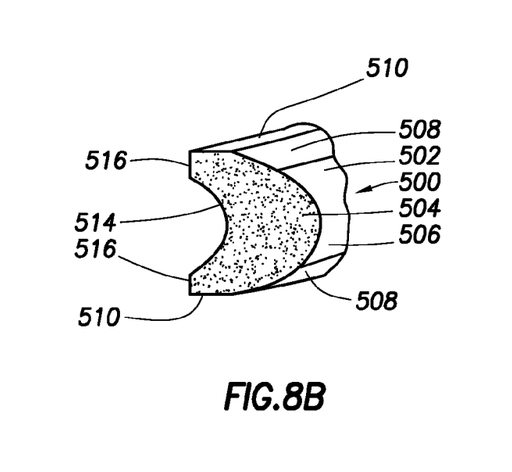

FIG. 8A shows an uncompressed sealing element 500 having a shell 502 and a core 504. FIG. 8B shows the sealing element of FIG. 8A in a compressed position. The shell has a cylindrical exterior face 506, relatively flat exterior angled faces 508, and relatively flat radially extending upper and lower surfaces 510 and 512, a cylindrical inner surface 514, and angled interior faces 516. Such a "diamond" shape can be designed to collapse as seen in FIG. 8B.

Figure 9B:
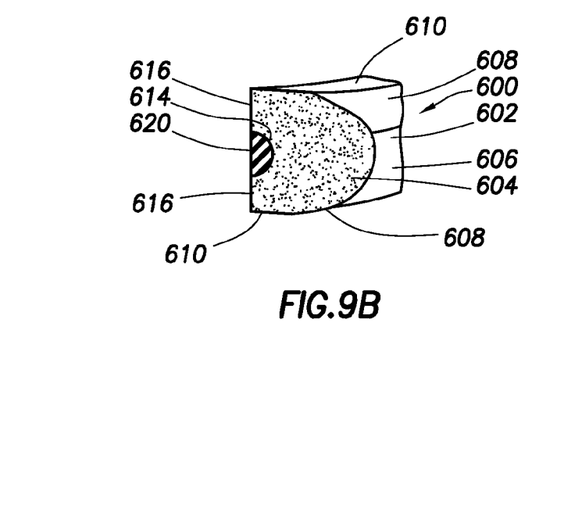

FIG. 9A shows an uncompressed sealing element 600 having a shell 602 and a core 604. FIG. 9B shows the sealing element of FIG. 9A in a compressed position. The shell has a cylindrical exterior face 606, relatively flat angled faces 608, and relatively flat and radially extending upper and lower surfaces 610 and 612. The interior surface 614 has one or more relatively cylindrical surfaces 616 for sealing against a mandrel or the like. The interior surface 614 further defines one or more curved surfaces 618, concave with respect to the mandrel and defining an annular space between the sealing element and the mandrel. The annular space is filled with an elastomeric support component 620 to allow a more predictable deformation.

To assist with placement or expansion of the sealing element, the core material can be selected to expand at preselected temperatures in order to provide a more effective seal. The core, for example, can include a solid that becomes a fluid at operating conditions surrounding the sealing assembly, including, for example, a solid having a low melting temperature. The core material has a distinctive, preselected melting temperature that allows actuation of the element at specific downhole temperatures, etc. The temperature can be used as the triggering event for setting the element. In situ or artificial means can be used to achieve setting temperature or act as a triggering event.

Figure 10:
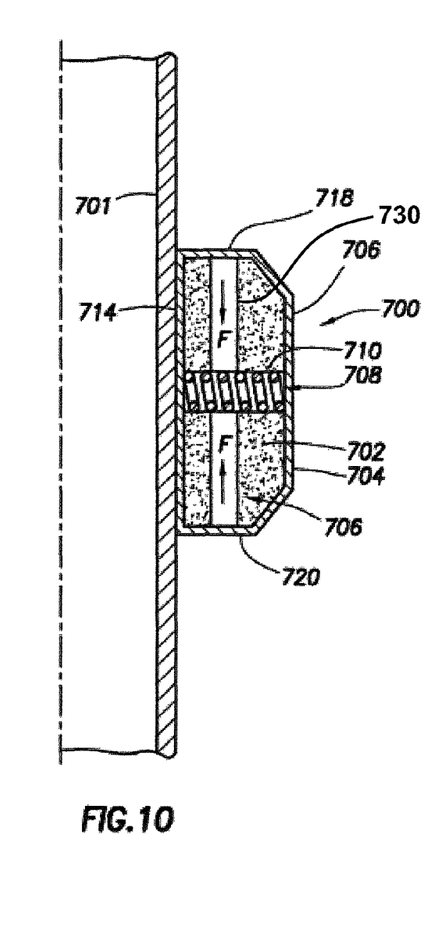
FIG. 10 is a schematic of an embodiment of a sealing element according to an aspect of the invention having an internal component to assist with setting or un-setting of the sealing element.

FIG. 10 is a schematic drawing of an embodiment of a sealing element 700 according to an aspect of the invention. To assist with placement or expansion of the sealing element 700 mounted on the mandrel 701, the interior space 702 defined by the shell 704 can, in addition to the core material 706, have an internal component 708 designed to assist with setting or un-setting of the sealing element. For example, an energy storage device 710, such as a spring, compressed gas, explosive, etc., can be positioned in the interior space 702. As an example, the sealing element can have an energy storage device 710 positioned in its interior which is pre-loaded to provide setting force. For example, one or more compressed springs, as shown, can be positioned to provide force against the interior surfaces of the inner and outer walls 714 and 716 of the shell 704. The spring, which remains solid, is trapped in the solid core material upon run-in. When the actuation temperature is reached, the core softens or melts and the spring is released to act against the sealing element walls to effect or assist in expansion. Similarly, an energy storage device 730 can be placed in tension and positioned longitudinally in the core space, attached to provide contracting force, F, on the upper and lower walls 718 and 720 of the shell. Thus the sealing element can be triggered and actuated without user intervention. The arrangement of the springs can be reversed such that the forces act against the walls of the shell to assist in unsetting of the sealing element.

Figure 11:
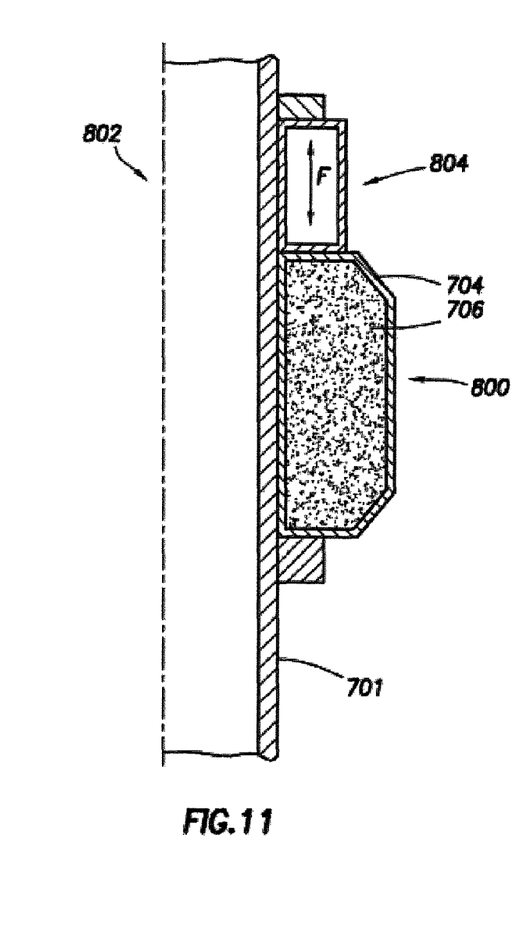
FIG. 11 is a schematic view of an exemplary tool according to an aspect of the invention having an external energy storage device.

In FIG. 11, a schematic view of an exemplary tool according to an aspect of the invention is presented having an external energy storage device. The sealing element 800 can be incorporated into a tool 802, such as a packer, that has a stored energy device 804 (spring, gas, etc.) mounted external to the sealing element and on the tool. When the sealing element is heated above the actuation point (melting, softening, etc., point) of the core material, the stored energy device acts with force, F, as indicated, and sets the tool automatically. This is of advantage for high temperature or steam injection wells, for example. Thus a tool can be set with no intervention and the trigger is temperature. Applying a stored force, such as a spring, a pressurized chamber, etc., for a boost on a sealing element has been disclosed, for example, in U.S. Pat. No. 7,387,158 to Murray et al., and U.S. Pat. No. 7,913,770 to Schramm et al., which are incorporated herein by reference for all purposes.

Use of the invention in open hole or large extrusion gap applications can be advantageous since these applications typically induce larger amounts of strain on standard elastomeric elements. Using the designs described herein, the strain on the element can be relatively reduced.

In addition, the invention provides or can provide other advantages. The sealing element, since it is solid during run-in, allows tools to be run without anti-preset devices for the elements. Further, sealing devices can be run-in relatively quickly on pipe or wireline because there is no risk of swabbing-off elements when below setting temperatures. The sealing device can be set with existing methods once the temperature is above the trigger temperature and so does not require entire redesign or elimination of current tool structures. Tabs can be welded onto the ends of the sealing element to allow elongation after use to unset and retrieve the tool. Further, even if elongation is not to original sealing element length, tabs on the element and attached to other tool parts will encourage axial elongation and radial contraction as the tool is pulled through restrictions in the well bore.

The sealing element uses a metal on metal seal instead of relying on an elastomer to hold pressure. The element employs the phase change or softening of an internal core component which occurs when the temperature increases and activates or allows mechanical compression using existing methods. The element can have an internal component designed to expand at temperatures involved in the placement and/or operation of the tool in order to seal more effectively. The elements can be set due to downhole change in temperature and so does not, in preferred embodiments, involve any intervention or communication with the surface.

While compositions and methods are described in terms of "comprising," "containing," or "including" various components or steps, the compositions and methods also can "consist essentially of" or "consist" of the various components and steps. As used herein, the words "comprise," "have," "include," and all grammatical variations thereof are each intended to have an open, non-limiting meaning that does not exclude additional elements or steps.

Therefore, the present inventions are well adapted to carry out the objects and attain the ends and advantages mentioned as well as those which are inherent therein. While the invention has been depicted, described, and is defined by reference to exemplary embodiments of the inventions, such a reference does not imply a limitation on the inventions, and no such limitation is to be inferred. The inventions are capable of considerable modification, alteration, and equivalents in form and function, as will occur to those ordinarily skilled in the pertinent arts and having the benefit of this disclosure. The depicted and described embodiments of the inventions are exemplary only, and are not exhaustive of the scope of the inventions. Consequently, the inventions are intended to be limited only by the spirit and scope of the appended claims, giving full cognizance to equivalents in all respects.

Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A sealing assembly for use on a tool in a wellbore, comprising:
   a deformable outer shell portion;
   an inner core comprising a material with a lower melting point than the outer shell and substantially enclosed within the outer shell, the deformable outer shell portion to be deformed into sealing contact with at least one adjacent surface within said wellbore, and wherein the inner core, in response to heating to a predetermined temperature, acts to effect radial expansion of the deformable outer shell portion; and
   an energy storage device positioned within the deformable outer shell portion, the energy storage device containing a quantity of stored energy, such that upon heating of the inner core to the predetermined temperature, the energy storage device is activated and provides at least one of a radially expansive force and an axially compressive force on the deformable outer shell portion.

2. The sealing assembly of claim 1, wherein the deformable outer shell portion comprises a metal.

3. The sealing assembly of claim 1, wherein the sealing assembly is retrievable.

4. The sealing assembly of claim 3, wherein the tool has an axial spring positioned in the deformable outer shell portion to assist in unsetting the sealing assembly.

5. The sealing assembly of claim 1, wherein the outer shell portion of the sealing assembly includes one or more corrugations, grooves, or concave surfaces to promote axial compression or radial expansion.

6. The sealing assembly of claim 5, further comprising an elastomeric ring positioned exterior to and abutting the deformable outer shell portion, the elastomeric ring for assisting in controlling radial expansion or axial compression of the sealing element.

7. The sealing assembly of claim 1, wherein the outer shell is coated with a material to provide better sealing.

8. The sealing assembly of claim 1, further comprising a mandrel positioned radially inward of the sealing element.

9. The sealing assembly of claim 8, further comprising at least one slip assembly and at least one wedge mounted on the mandrel.

10. The sealing assembly of claim 1, wherein the inner core is made of a metal or polymer material which softens or melts at the predetermined temperature.

11. A sealing assembly for use on a tool in a wellbore, comprising:
    a deformable outer shell portion;
    an inner core comprising a material with a lower melting point than the outer shell and substantially enclosed within the outer shell, the deformable outer shell portion to be deformed into sealing contact with at least one adjacent surface within said wellbore, wherein the inner core, in response to heating to a predetermined temperature, acts to effect radial expansion of the deformable outer shell portion, and wherein the inner core contains a quantity of stored energy; and a preloaded spring mounted within the deformable outer shell portion, the spring containing the quantity of stored energy, such that upon heating of the inner core to the predetermined temperature, the spring is activated and provides radially expansive force on the deformable outer shell portion.

12. A method of sealing a subterranean well, the method comprising the steps of:

placing an annular sealing element around the exterior of a tubular member, the sealing element comprising a deformable outer shell, an inner core material with a lower melting point than the outer shell, the inner core material substantially enclosed within the outer shell, and an energy storage device positioned within the deformable outer shell portion, the energy storage device containing a quantity of stored energy;

positioning the tubular member and the annular sealing element in the well;

softening or melting the inner core material in response to exposure of the sealing element to a predetermined temperature, wherein, upon softening or melting of the inner core material in response to exposure of the sealing element to the predetermined temperature, the energy storage device is activated and provides at least one of a radially expansive force and an axially compressive force on the deformable outer shell portion;

radially expanding and axially compressing the outer shell; and sealing a surface of the deformable outer shell against a surface in the well.

13. The method of claim 12, wherein the seal element comprises an atypical shape in order to compress properly.

14. The method of claim 12, further comprising the step of causing a more predictable deformation of the sealing element using an elastomeric ring positioned radially inwardly from the outer shell.

15. The method of claim 12, wherein the inner material comprises a relatively low compressibility material with a high melting temperature and high coefficient of expansion.

16. The method of claim 12, wherein the inner core material is selected from the group consisting of low melting point steel, corrosion-resistant alloy (CRA), titanium alloys, nickel alloys, tin, lead, wood's metal, model metal, solder, pewter, plastics, and polymers.

17. The method of claim 12, further comprising the step of thermally expanding the inner core material.

18. The method of claim 12, further comprising the step of unsetting the annular sealing element.

19. The method of claim 18, further comprising the step of retrieving the annular sealing element.

20. The method of claim 12, wherein the outer shell material comprises a metal, and wherein the step of sealing further comprises the step of providing a metal-to-metal seal.

* * * * *